United States Patent
Shiina et al.

(10) Patent No.: US 10,234,016 B2
(45) Date of Patent: Mar. 19, 2019

(54) HEAT EXCHANGING DEVICE

(71) Applicant: TOYOTA JIDOSHA KABUSHIKI KAISHA, Toyota-shi (JP)

(72) Inventors: Takahiro Shiina, Numazu (JP); Daisuke Tokozakura, Susono (JP); Kazuya Arakawa, Fujinomiya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 413 days.

(21) Appl. No.: 15/196,396

(22) Filed: Jun. 29, 2016

(65) Prior Publication Data

US 2017/0037954 A1   Feb. 9, 2017

(30) Foreign Application Priority Data

Aug. 6, 2015   (JP) ................... 2015-156217

(51) Int. Cl.
*F16H 57/04* (2010.01)
*F28D 15/00* (2006.01)
(Continued)

(52) U.S. Cl.
CPC ......... *F16H 57/0417* (2013.01); *F28D 15/00* (2013.01); *F28F 27/02* (2013.01); *F28D 2021/0089* (2013.01); *F28F 2250/08* (2013.01)

(58) Field of Classification Search
CPC .. F16H 57/0417; F16H 57/0415; F16H 59/78; F28F 27/02; F28F 2011/0045; F28F 2011/0061; F28D 2021/0089; F28D 2021/0049; F02D 2200/023; F02D 41/064; F01P 7/165; F01P 2007/146; F01P 2003/006; F01P 2003/008; F01P 7/00; F01P 7/14; F01P 7/16; F01M 5/005; F01M 5/007; F01M 2005/008; F01M 5/02
(Continued)

(56) References Cited

U.S. PATENT DOCUMENTS 2,726,557 A * 12/1955 Ackerman ............ F15B 21/045
137/468
4,535,729 A *  8/1985 Faylor ..................... F01P 3/20
123/41.1
(Continued)

FOREIGN PATENT DOCUMENTS

EP          2 317 185 B1     5/2011
JP        2006-283872 A    10/2006
(Continued)

*Primary Examiner* — Orlando E Aviles Bosques
*Assistant Examiner* — Jose O Class-Quinones
(74) *Attorney, Agent, or Firm* — Oblon, McClelland, Maier & Neustadt, L.L.P.

(57) ABSTRACT

A heat exchanging device includes: a heat exchanger configured to perform heat exchange between first operating oil used in an engine and second operating oil used in a fluid transmitting device and an automatic transmission; and a heat exchanging amount decreasing unit configured to, when a temperature of the second operating oil is lower than a predetermined temperature at which it is allowed to engage a lock-up mechanism, decrease a flow amount of at least one of the first and second operating oil flowing in the heat exchanger as compared to a case in which the temperature of the second operating oil is not lower than the predetermined temperature.

4 Claims, 10 Drawing Sheets

(51) Int. Cl.
*F28F 27/02* (2006.01)
*F28D 21/00* (2006.01)

(58) Field of Classification Search
USPC ........ 165/299, 287, 296, 297, 300; 184/6.22
See application file for complete search history.

(56) References Cited

U.S. PATENT DOCUMENTS

| | | | | |
|---|---|---|---|---|
| 5,335,708 | A * | 8/1994 | Murakami | F28F 27/02 165/297 |
| 5,678,461 | A * | 10/1997 | Stine | F01P 3/20 184/6 |
| 6,012,550 | A * | 1/2000 | Lee | F16H 57/0412 165/300 |
| 6,536,381 | B2 * | 3/2003 | Langervik | F01P 3/20 123/196 AB |
| 6,537,178 | B1 * | 3/2003 | Takizawa | F16H 61/143 477/168 |
| 7,753,105 | B2 * | 7/2010 | Acre | B60H 1/3227 165/43 |
| 8,100,106 | B2 * | 1/2012 | Kardos | F01M 5/00 123/142.5 R |
| 8,409,055 | B2 * | 4/2013 | Gooden | F01M 5/001 165/41 |
| 8,678,078 | B2 * | 3/2014 | Samie | F16H 57/0413 123/142.5 R |
| 8,731,789 | B2 * | 5/2014 | Ulrey | F16H 57/0413 123/142.5 R |
| 9,255,386 | B2 * | 2/2016 | Kikuchi | E02F 9/0866 |
| 9,611,127 | B2 * | 4/2017 | Sakai | F16H 41/30 |
| 2003/0050150 | A1 * | 3/2003 | Tanaka | B60H 1/03 477/62 |
| 2006/0060345 | A1 * | 3/2006 | Flik | F01P 3/20 165/297 |
| 2006/0060346 | A1 * | 3/2006 | Sasaki | F01P 11/08 165/297 |
| 2006/0157000 | A1 * | 7/2006 | Lutze | F01P 3/20 123/41.02 |
| 2008/0029246 | A1 * | 2/2008 | Fratantonio | F16H 57/0412 165/103 |
| 2011/0146945 | A1 * | 6/2011 | Morita | B60H 1/00764 165/51 |
| 2011/0276239 | A1 * | 11/2011 | Nagashima | F02D 37/02 701/54 |
| 2012/0161042 | A1 * | 6/2012 | Sheppard | F01M 5/007 251/11 |
| 2013/0217539 | A1 * | 8/2013 | Natsume | B60K 6/48 477/52 |

FOREIGN PATENT DOCUMENTS

| | | |
|---|---|---|
| JP | 2007-85457 | 4/2007 |
| JP | 4254363 | 4/2009 |
| JP | 2009-144529 A | 7/2009 |

* cited by examiner

HEAT EXCHANGING DEVICE

CROSS-REFERENCE TO RELATED APPLICATION(S)

The present application claims priority to and incorporates by reference the entire contents of Japanese Patent Application No. 2015-156217 filed in Japan on Aug. 6, 2015.

BACKGROUND OF THE INVENTION

1. Field of the Invention

The disclosure relates to a heat exchanging device.

2. Description of the Related Art

Japanese Patent Application Laid-open No. 2007-085457 discloses a heat exchanging device mounted on a vehicle. The heat exchanging device which performs heat exchange between operating oil (engine oil) used in an engine and operating oil (transmission oil) used in an automatic transmission is configured to heat the transmission oil by the engine oil at the time of cold start of the engine.

In a vehicle on which an automatic transmission is mounted, a fluid transmitting device (torque converter) is provided between an engine and the automatic transmission. The fluid transmitting device filled with operating oil is provided with a lock-up mechanism. The fluid transmitting device engages or disengages the lock-up mechanism by hydraulic pressure supplied from a hydraulic circuit. The hydraulic circuit is configured to supply the automatic transmission being a lubricating unit with oil together with the fluid transmitting device and circulate the oil. That is, the same oil is used in the fluid transmitting device and the automatic transmission, so that a state of the fluid transmitting device relates to temperature change of the transmission oil. However, the state of the fluid transmitting device and the lock-up mechanism is not taken into consideration in the heat exchanging device disclosed in Japanese Patent Application Laid-open No. 2007-085457.

Therefore, the inventors of the present invention execute an evaluation test for clarifying the relationship between the temperature change of the transmission oil and the state of the fluid transmitting device after cold start of the engine. An evaluation result is illustrated in FIG. 12. FIG. 12 is a time chart illustrating the evaluation result when the vehicle travels at an arbitrary vehicle speed after the cold start of the engine. Meanwhile, in the evaluation test illustrated in FIG. 12, control to prohibit the engagement of the lock-up mechanism when a temperature of the transmission oil is lower than a predetermined temperature after the cold start of the engine and allow the engagement of the lock-up mechanism when the temperature of the transmission oil is not lower than a predetermined temperature is executed.

In an example illustrated in FIG. 12, immediately after the cold start of the engine, the temperature of the transmission oil is lower than a predetermined temperature and it is prohibited to engage the lock-up mechanism, so that the lock-up mechanism is disengaged before time point $t_1$ (L/U: OFF). Thereafter, the temperature of the transmission oil becomes not lower than the above-described predetermined temperature at time point $t_1$, and according to this, the lock-up mechanism is engaged (L/U: ON). The temperature of the transmission oil at time point $t_1$ at which the engagement of the lock-up mechanism is started is set to an L/U starting temperature. In a state in which the lock-up mechanism is disengaged before time point $t_1$, a heat exchanging amount of the transmission oil takes a negative value as a result of the heat exchange between the engine oil and the transmission oil. This indicates that heat transfers from the transmission oil to the engine oil. When the heat exchanging amount takes a positive value, the transmission oil temperature rises, and when the heat exchanging amount takes the negative value, the transmission oil temperature falls. Therefore, before time point $t_1$, a transmission oil temperature $T_{OUT}$ after passing through the heat exchanger is such that the temperature with the heat exchange is lower than the temperature without the heat exchange.

The inventors of the present invention learn that the transmission oil temperature is higher than an engine oil temperature and the heat transfers from the automatic transmission to the engine during a warm-up of the automatic transmission (initial stage of warm-up) from the evaluation result illustrated in FIG. 12. It is considered that a fact that a pump impeller and a turbine runner rotate relative to each other in the fluid transmitting device and the operating oil is shaken to generate the heat in the fluid transmitting device due to the disengagement of the lock-up mechanism at the initial stage of the warm-up has a relationship with a rise in the transmission oil temperature.

When the heat transfers from the automatic transmission to the engine at the time of the warm-up of the automatic transmission, the rise in the temperature of the transmission oil delays and fuel consumption is deteriorated as indicated in the evaluation result illustrated in FIG. 12.

There is a need for a heat exchanging device mounted on the vehicle provided with the engine, the fluid transmitting device, the lock-up mechanism, and the automatic transmission, the heat exchanging device which promotes the rise in the temperature of the transmission oil at the time of the warm-up of the automatic transmission to improve the fuel consumption.

SUMMARY OF THE INVENTION

It is an object of the present invention to at least partially solve the problems in the conventional technology.

A heat exchanging device according to one aspect of the present invention is mounted on a vehicle provided with an engine, a fluid transmitting device including a lock-up mechanism, and an automatic transmission connected to the engine through the fluid transmitting device. The heat exchanging device includes: a heat exchanger configured to perform heat exchange between first operating oil used in the engine and second operating oil used in the fluid transmitting device and the automatic transmission; and a heat exchanging amount decreasing unit configured to, when a temperature of the second operating oil is lower than a predetermined temperature at which it is allowed to engage the lock-up mechanism, decrease a flow amount of at least one of the first and second operating oil flowing in the heat exchanger as compared to a case in which the temperature of the second operating oil is not lower than the predetermined temperature.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6A is an illustrative diagram illustrating a flow of oil when a switching valve of a first variation is completely turned on.

FIG. 9A is an illustrative diagram illustrating a flow of oil when a switching valve of a second variation is turned on.

DETAILED DESCRIPTION OF THE PREFERRED EMBODIMENTS

A heat exchanging device of an embodiment of the present invention is hereinafter specifically described with reference to the drawings.

1. First Embodiment

Figure 1:
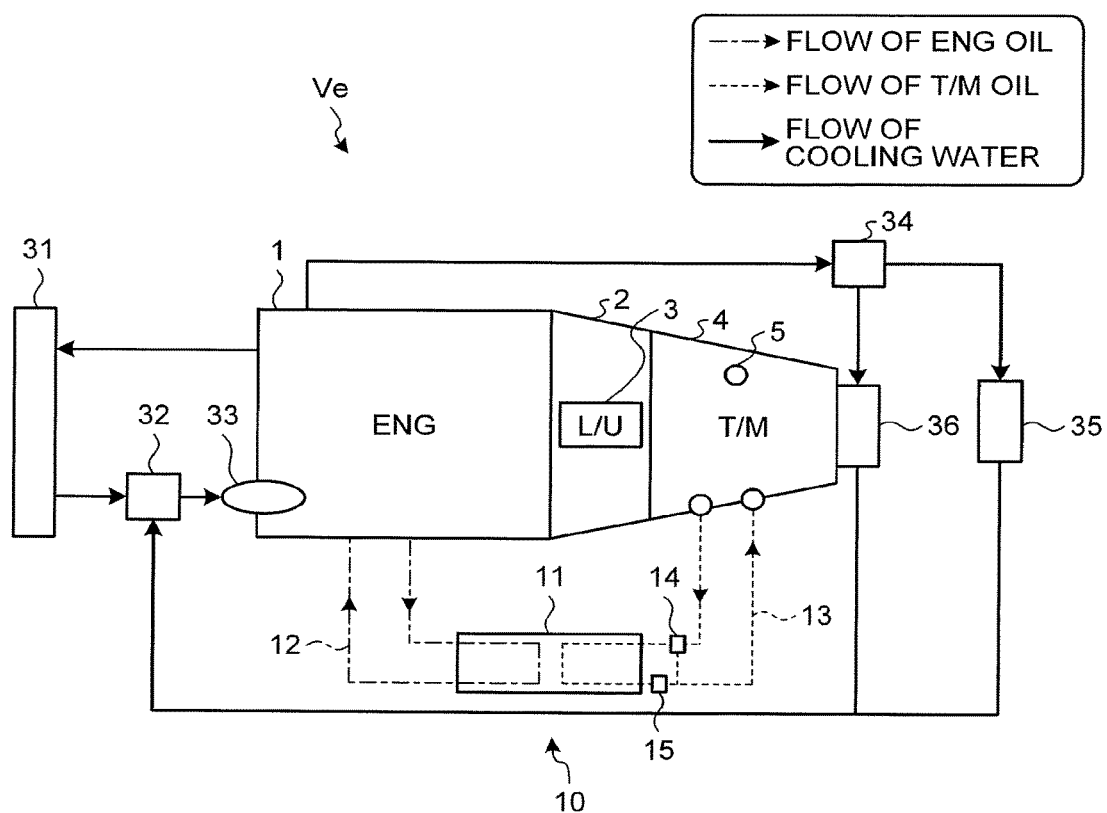
FIG. 1 is a schematic diagram illustrating a schematic configuration of a vehicle and a heat exchanging device mounted on the vehicle which are targets of a first embodiment of the present invention.

FIG. 1 is a schematic diagram illustrating a schematic configuration of a heat exchanging device 10 mounted on a vehicle Ve. The vehicle Ve is provided with an engine (ENG) 1 being a power source, a fluid transmitting device 2, a lock-up mechanism (L/U) 3 provided in the fluid transmitting device 2, and an automatic transmission (T/M) 4. Power output from the engine 1 is transmitted to the automatic transmission 4 through the fluid transmitting device 2. The power is transmitted from an output shaft of the automatic transmission 4 to a drive wheel through a differential and the like (none of them is illustrated).

The fluid transmitting device 2 is a well-known torque converter which causes an amplifying action of torque by operating fluid (operating oil). The fluid transmitting device 2 is provided with the lock-up mechanism 3 in its case filled with the operating oil. The lock-up mechanism 3 is configured to be engaged or disengaged by hydraulic pressure supplied from a hydraulic circuit 6 (illustrated in FIG. 3) to be described later into the fluid transmitting device 2. In a state in which the lock-up mechanism 3 is disengaged, the power output from the engine 1 is transmitted through the operating oil in the fluid transmitting device 2 to the automatic transmission 4. In a state in which the lock-up mechanism 3 is engaged, the engine 1 is directly connected to the automatic transmission 4, so that the power output from the engine 1 is directly transmitted to the automatic transmission 4 without intervention of the operating oil in the fluid transmitting device 2.

In the vehicle Ve, the fluid transmitting device 2 is connected to the hydraulic circuit 6 (illustrated in FIG. 3) and it is configured such that oil discharged from the hydraulic circuit 6 is used as lubricating oil of the automatic transmission 4. For example, the operating oil in the fluid transmission device 2 is discharged from the hydraulic circuit 6 to be supplied to the automatic transmission 4 as a unit requiring lubrication. That is, the oil (operating oil) used as the lubricating oil of the automatic transmission 4 and the oil (operating oil) used as the operating fluid of the fluid transmitting device 2 are the same. In this description, the operating oil used in the automatic transmission 4 and the operating oil used in the fluid transmitting device 2 are collectively referred to as "transmission oil". An oil temperature sensor 5 which detects a temperature of the oil in the hydraulic circuit 6 (hereinafter, simply referred to as "oil temperature") $T_{HO}$ is also provided. That is, the oil temperature $T_{HO}$ detected by the oil temperature sensor 5 is the temperature of the transmission oil in the hydraulic circuit 6. Meanwhile, the oil temperature sensor 5 may also be an existing sensor provided downstream of an oil pump of the hydraulic circuit 6. For example, the temperature (oil temperature $T_{HO}$) of the oil just discharged from the oil pump is detected by the oil temperature sensor 5. The oil temperature sensor 5 is provided in an oil passage connected to a discharge port of the oil pump, for example, the oil passage in which pressure of the oil is adjusted to line pressure.

A well-known cooling system in which cooling water of the engine 1 is used and the heat exchanging device 10 which performs heat exchange between operating oil used in the engine 1 (hereinafter, referred to as "engine oil") and the transmission oil are mounted on the vehicle Ve.

The cooling system is provided with a radiator 31, a thermostat 32, a water pump 33, a water passage switching valve 34, a heater core 35, and an oil cooler 36. In a radiator circulation passage, the cooling water flowing out of a water jacket of the engine 1 flows from the radiator 31 through the thermostat 32 to return again to the water jacket. In a heat exchanging circulation passage of the cooling water, the cooling water flowing out of the water jacket of the engine 1 flows from the water passage switching valve 34 through the heater core 35 or the oil cooler 36 to reach the water pump 33. In the oil cooler 36, the heat exchange is performed between the cooling water and the operating oil of the automatic transmission 4. In the heat exchanging circulation passage of the cooling water, the cooling water flows through the water pump 33 to return again to the water jacket of the engine 1.

The heat exchanging device 10 is provided with a heat exchanger 11 which performs the heat exchange between the engine oil and the transmission oil, an engine oil circulation passage 12 in which the engine oil circulates, and a transmission oil circulation passage 13 in which the transmission oil circulates. The engine oil circulation passage 12 forms a route in which the engine oil flowing out of the engine 1 flows through the heat exchanger 11 to return again to the engine 1. The transmission oil circulation passage 13 forms a route in which the transmission oil flowing out of the automatic transmission 4 flows through the heat exchanger 11 to return again to the automatic transmission 4. A switching valve 14 and a check valve 15 are provided in the transmission oil circulation passage 13.

The switching valve 14 is a direction switching valve which switches a flow passage of the transmission oil based on the oil temperature $T_{HO}$. The switching valve 14 is a spool type electromagnetic valve in which elastic force from a return spring 14a acts on a spool located therein. In the heat exchanging device 10, it is switched between excitation and non-excitation of the switching valve 14 by the control of an electronic control unit (hereinafter, referred to as "ECU") 20. For example, the switching valve 14 is turned on when being excited and turned off when this is not excited.

Figure 2A:
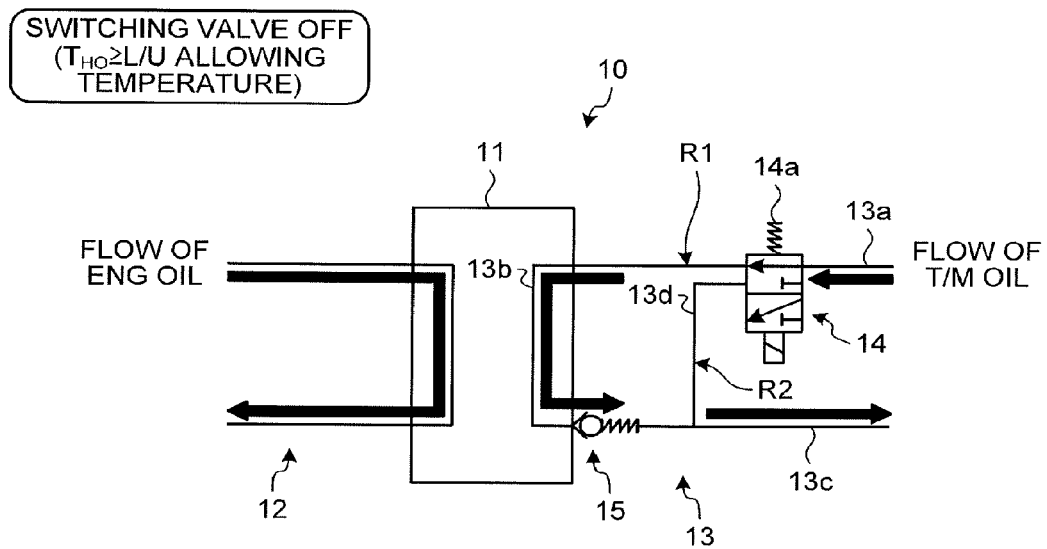
FIG. 2A is an illustrative diagram illustrating a flow of oil when an oil temperature is not lower than a lock-up allowing temperature.
Figure 2B:
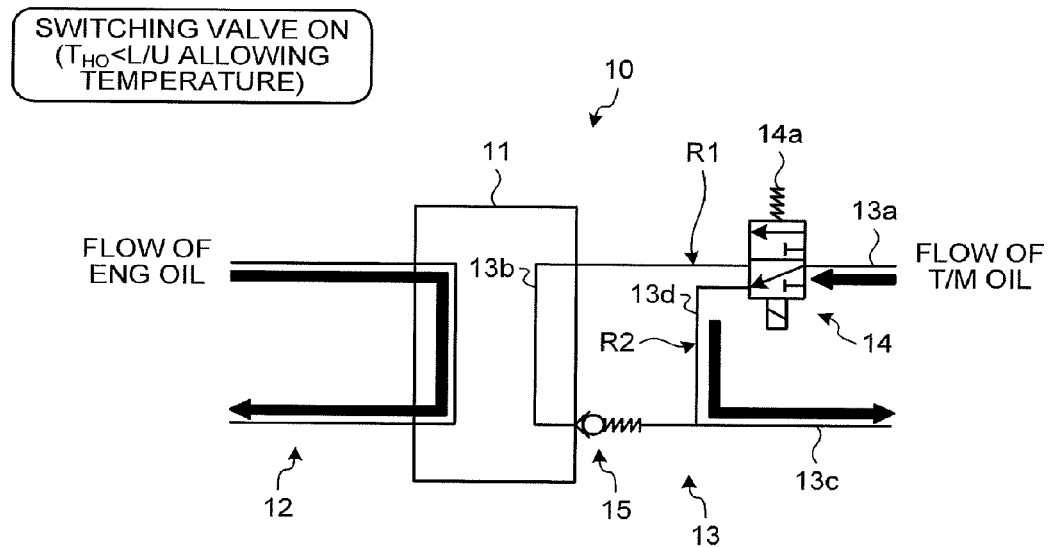
FIG. 2B is an illustrative diagram illustrating the flow of the oil when the oil temperature is lower than the lock-up allowing temperature.

Here, the flow of the oil in the transmission oil circulation passage 13 is described with reference to FIGS. 2A and 2B. FIG. 2A is an illustrative diagram illustrating the flow of the oil when the oil temperature $T_{HO}$ is not lower than a lock-up allowing temperature. FIG. 2B is an illustrative diagram illustrating the flow of the oil when the oil temperature $T_{HO}$ is lower than the lock-up allowing temperature.

In the transmission oil circulation passage 13, the transmission oil flowing out of the automatic transmission 4 flows in an introducing flow passage 13a to reach the switching valve 14. A heat exchanging flow passage 13b formed in the heat exchanger 11 and a bypass flow passage 13d communicating with a return flow passage 13c are connected to a downstream side port (outlet) of the switching valve 14. The heat exchanging flow passage 13b and the bypass flow passage 13d are formed in parallel and a downstream side of the heat exchanging flow passage 13b is connected to the return flow passage 13c through the check valve 15. The transmission oil in the return flow passage 13c flows to return to the automatic transmission 4. That is, the switching valve 14 switches a destination of the introducing flow passage 13a between the heat exchanging flow passage 13b and the bypass flow passage 13d, thereby selectively switching between a heat exchanging route R1 which passes through the heat exchanger 11 and a non-heat exchanging route R2 which does not pass through the heat exchanger 11 in the transmission oil circulation passage 13.

As illustrated in FIG. 2A, the heat exchanging route R1 is formed of the introducing flow passage 13a, the switching valve 14, the heat exchanging flow passage 13b, the check valve 15, and the return flow passage 13c in this order from an upstream side to a downstream side. The switching valve 14 is turned off when the oil temperature $T_{HO}$ is not lower than the lock-up allowing temperature to open the heat exchanging route R1 and block the non-heat exchanging route R2. The lock-up allowing temperature is a threshold for allowing the engagement of the lock-up mechanism 3 which is prohibited in a state in which the oil temperature $T_{HO}$ is low. The transmission oil in the heat exchanging route R1 flows from the introducing flow passage 13a through the switching valve 14 to flow in the heat exchanging flow passage 13b, so that the transmission oil flows in the heat exchanger 11. Then, the transmission oil on which the heat exchange with the engine oil is performed in the heat exchanger 11 flows from the heat exchanging flow passage 13b through the check valve 15 to flow into the return flow passage 13c and flows in the return flow passage 13c toward the automatic transmission 4.

As illustrated in FIG. 2B, the non-heat exchanging route R2 is formed of the introducing flow passage 13a, the switching valve 14, the bypass flow passage 13d, and the return flow passage 13c in this order from an upstream side to a downstream side. The switching valve 14 is turned on when the oil temperature $T_{HO}$ is lower than the lock-up allowing temperature to block the heat exchanging route R1 and open the non-heat exchanging route R2. The transmission oil in the non-heat exchanging route R2 flows from the introducing flow passage 13a through the switching valve 14 to flow in the bypass flow passage 13d, so that this does not flow in the heat exchanger 11. That is, in the non-heat exchanging route R2, the transmission oil on which the heat exchange with the engine oil is not performed returns again to the automatic transmission 4.

Figure 3:
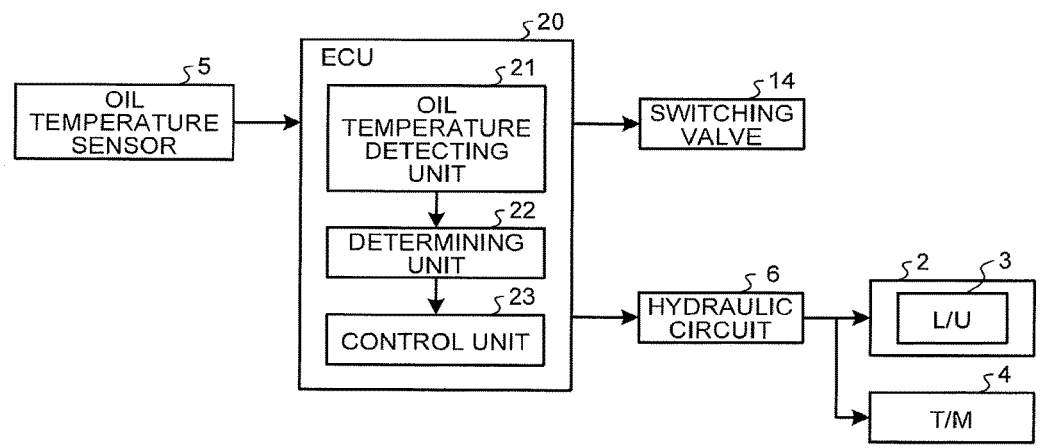
FIG. 3 is a functional block diagram illustrating an example of an electronic control unit.

FIG. 3 is a functional block diagram schematically illustrating the ECU 20. The ECU 20 provided with a central processing unit (CPU), a random access memory (RAM), and a read only memory (ROM) executes arithmetic operation according to a predetermined program based on input data and data stored in advance. A signal from the oil temperature sensor 5 which detects the oil temperature $T_{HO}$ is input to the ECU 20. The ECU 20 outputs an instruction signal based on a result of various types of arithmetic processing to control the switching valve 14 and the hydraulic circuit 6.

The ECU 20 is provided with an oil temperature detecting unit 21, a determining unit 22, and a control unit 23. The oil temperature detecting unit 21 detects the oil temperature $T_{HO}$ in the hydraulic circuit 6 based on the input signal from the oil temperature sensor 5. The determining unit 22 determines whether various conditions are satisfied by using the oil temperature $T_{HO}$ detected by the oil temperature detecting unit 21. The control unit 23 outputs the instruction signal to an electromagnetic valve provided in the hydraulic circuit 6 to control the hydraulic pressure supplied to the fluid transmitting device 2 and control the engagement and the disengagement of the lock-up mechanism 3.

The control unit 23 executes the control (lock-up control) to engage the lock-up mechanism 3. First, at the time of the lock-up control, the determining unit 22 determines whether the condition for disabling execution of the lock-up control (prohibiting condition), a condition for enabling the execution of the prohibited lock-up control (allowing condition), and a condition for actually executing the lock-up control (executing condition) are satisfied. The prohibiting condition is a condition in which the oil temperature $T_{HO}$ is lower than a predetermined lock-up allowing temperature. That is, the allowing condition is a condition in which the oil temperature $T_{HO}$ is not lower than the predetermined lock-up allowing temperature. The executing condition is a condition in which the oil temperature $T_{HO}$ is not lower than the lock-up allowing temperature and in which a rotational speed difference between a pump impeller and a turbine runner in the fluid transmitting device 2 is not larger than a predetermined value.

For example, when the determining unit 22 determines that the prohibiting condition is satisfied, the control unit 23 prohibits the engagement of the lock-up mechanism 3. When the determining unit 22 determines that the allowing condition is satisfied, the above-described prohibition is cancelled and the control unit 23 may execute the lock-up control. When the determining unit 22 determines that the executing condition is satisfied, the control unit 23 controls the hydraulic circuit 6 to execute the lock-up control. Even in a case in which the allowing condition is satisfied, if the rotational speed difference in the fluid transmitting device 2 is larger than a predetermined value, the executing condition is not satisfied, so that the control unit 23 does not execute the lock-up control.

Furthermore, the control unit 23 executes control to change a heat exchanging amount of the transmission oil (heat exchanging amount control) based on the oil temperature $T_{HO}$ and the lock-up allowing temperature. Specifically, the control unit 23 controls the switching valve 14 to change the heat exchanging amount of the transmission oil.

Figure 4:
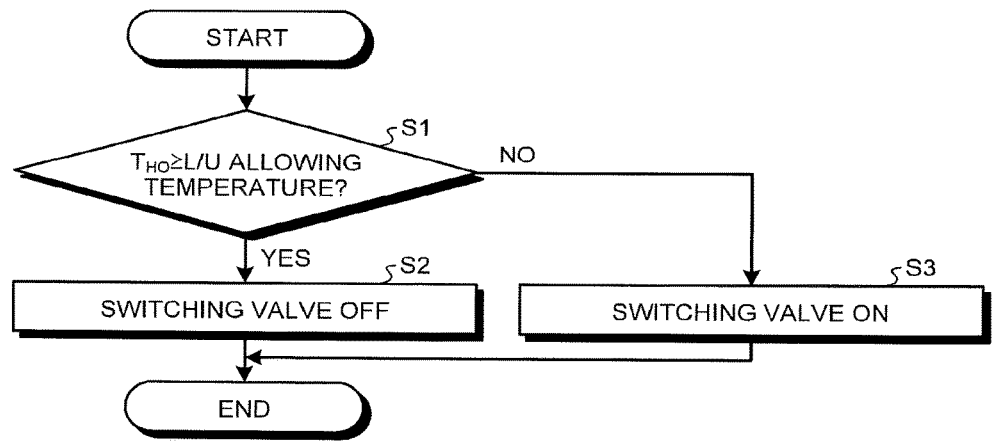
FIG. 4 is a flowchart illustrating an example of heat exchanging amount control.

FIG. 4 is a flowchart illustrating an example of the heat exchanging amount control. The ECU 20 executes the heat exchanging amount control in FIG. 4 at that time of cold start of the engine 1, that is, during a warm-up of the automatic transmission 4. The determining unit 22 determines whether the oil temperature $T_{HO}$ is not lower than the lock-up allowing temperature (step S1). When the oil temperature $T_{HO}$ is not lower than the lock-up allowing temperature (step S1: Yes), the control unit 23 turns off the switching valve 14 to open the heat exchanging route R1 (step S2). By the control at step S2, the transmission oil flows through the heat exchanger 11 to return to the automatic transmission 4.

On the other hand, when the oil temperature $T_{HO}$ is lower than the lock-up allowing temperature (step S1: No), the control unit 23 turns on the switching valve 14 to block the heat exchanging route R1 (step S3). By the control at step S3, the switching valve 14 opens the non-heat exchanging route R2, so that the transmission oil flows to return to the automatic transmission 4 without passing through the heat exchanger 11. That is, when the oil temperature $T_{HO}$ is lower than the lock-up allowing temperature, the ECU 20 executes control to decrease a flow amount of the transmission oil flowing in the heat exchanger 11 as compared to a case in which the oil temperature $T_{HO}$ is not lower than the lock-up allowing temperature. Then, the ECU 20 executes the control at step S2 or S3 to finish this control routine. Meanwhile, the oil flow amount is intended to mean the amount of the oil passing through a flow passage cross section per unit time.

For example, when the oil temperature $T_{HO}$ rises from the temperature lower than the lock-up allowing temperature to the temperature not lower than the lock-up allowing temperature after the cold start of the engine 1, the switching valve 14 switches the flow passage of the transmission oil from the non-heat exchanging route R2 to the heat exchanging route R1. In a first embodiment, the switching valve 14 and the ECU 20 are included in a heat exchanging amount decreasing unit which decreases the flow amount of the transmission oil flowing in the heat exchanger 11 when the oil temperature $T_{HO}$ is lower than the lock-up allowing temperature.

Figure 5:
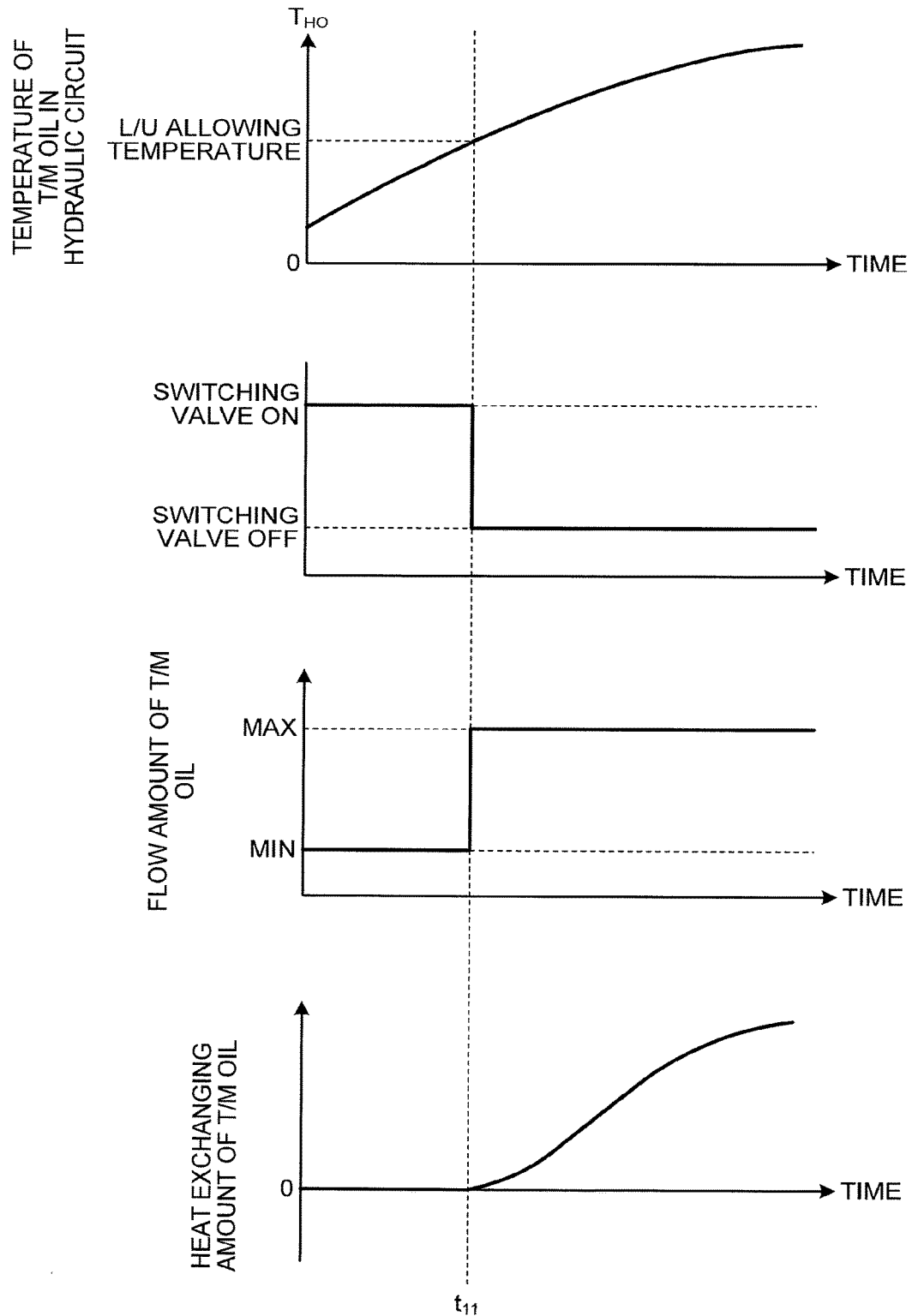
FIG. 5 is a time chart illustrating change in a vehicle state after cold start of an engine.

FIG. 5 is a time chart illustrating change in a vehicle state after the cold start of the engine 1. Before time point $t_{11}$, it is immediately after the cold start of the engine 1 and the oil temperature $T_{HO}$ is lower than the lock-up allowing temperature, so that the lock-up engagement is prohibited and the lock-up mechanism 3 in the fluid transmitting device 2 is disengaged. Since the switching valve 14 blocks the heat exchanging route R1, the flow amount of the transmission oil flowing in the heat exchanger 11 takes a minimum value MIN. In short, the heat exchange is not performed between the engine oil and the transmission oil.

After the cold start of the engine 1, the oil temperature $T_{HO}$ rises in a state in which the lock-up mechanism 3 is disengaged to reach the lock-up allowing temperature (time point $t_{11}$). At time point $t_{11}$, the switching valve 14 switches from a turned-on state to a turned-off state. According to this, the heat exchanging route R1 opens and the flow amount of the transmission oil flowing in the heat exchanger 11 switches from the minimum value MIN to a maximum value MAX. After time point $t_{11}$ the heat exchange between the engine oil and the transmission oil starts, so that the transmission oil heat exchanging amount starts increasing from zero. Meanwhile, when the transmission oil heat exchanging amount illustrated in FIG. 5 takes a positive value, this indicates that heat transfers from the engine oil to the transmission oil. That is, this indicates that the transmission oil is heated by the engine oil.

As described above, according to the first embodiment, the heat exchange between the engine oil and the transmission oil is controlled based on the oil temperature and the lock-up allowing temperature used for controlling the lock-up mechanism. Especially, when the automatic transmission is being warmed up and the oil temperature is lower than the lock-up allowing temperature, the flow amount of the transmission oil circulating in the heat exchanger may be decreased as compared to that after the warm-up is completed. According to this, it is possible to inhibit deterioration in fuel consumption due to heat transfer from the automatic transmission to the engine immediately after the cold start of the engine.

Meanwhile, it is sufficient that the heat exchanging route R1 is blocked when the oil temperature $T_{HO}$ is lower than the lock-up allowing temperature, so that the switching valve 14 is not necessary required to open the non-heat exchanging route R2 at the time of the blockage. That is, when the heat exchanging route R1 is blocked, the switching valve 14 is not required to allow the introducing flow passage 13a to communicate with the bypass flow passage 13d. For example, the switching valve 14 may selectively switch between a case of opening the heat exchanging route R1 by allowing the introducing flow passage 13a to communicate with the heat exchanging flow passage 13b and a case of blocking the heat exchanging route R1 by blocking a section between an upstream side port (inlet) to which the introducing flow passage 13a is connected and the downstream side port (outlet) such that the circulation cannot be performed.

2. Variations of First Embodiment

Variations of the above-described first embodiment are described herein. In a first variation, a switching valve 16 formed of a flow amount control valve is provided in place of the switching valve 14 of the first embodiment. Meanwhile, the configuration similar to that of the above-described embodiment is not described and the reference numeral thereof is cited.

Figure 6A:
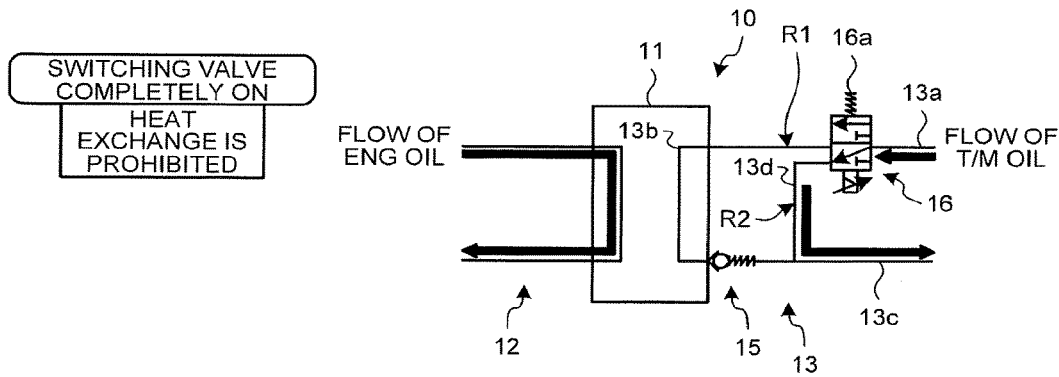
Figure 6B:
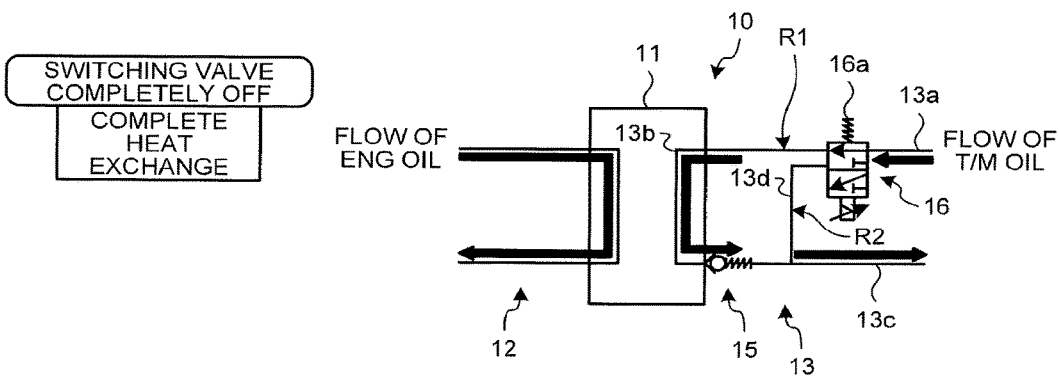
FIG. 6B is an illustrative diagram illustrating the flow of the oil when the switching valve of the first variation is completely turned off.

FIG. 6A is an illustrative diagram illustrating a flow of oil when the switching valve 16 is completely turned on. FIG. 6B is an illustrative diagram illustrating the flow of the oil when the switching valve 16 is completely turned off. When the valve is completely turned on, a heat exchanging route R1 is completely closed. When the valve is completely turned off, the heat exchanging route R1 is completely opened. The switching valve 16 being a spool type electromagnetic valve is configured to continuously change a flow amount of transmission oil running from an introducing flow passage 13a to a heat exchanger 11. Elastic force from a return spring 16a acts on a spool located in the switching valve 16. As illustrated in FIG. 6A, when the switching valve 16 is completely turned on, a heat exchanging device 10 is in a state in which heat exchange in the heat exchanger 11 is prohibited. The switching valve 16 completely closes the heat exchanging route R1 and completely opens a non-heat exchanging route R2. Therefore, the transmission oil only flows in the non-heat exchanging route R2. As illustrated in FIG. 6B, when the switching valve 16 is completely turned off, the heat exchanging device 10 is in a state in which complete heat exchange is performed between engine oil and the transmission oil in the heat exchanger 11. The switching valve 16 completely opens the heat exchanging route R1 and completely closes the non-heat exchanging route R2. Therefore, the transmission oil only flows in the heat exchanging route R1. The heat exchanging device 10 of the first variation is configured such that the flow amount of the transmission oil circulating in a heat exchanging flow passage 13b continuously increases while the switching valve 16 is switched from a completely turned-on state to a completely turned-off state.

Figure 7:
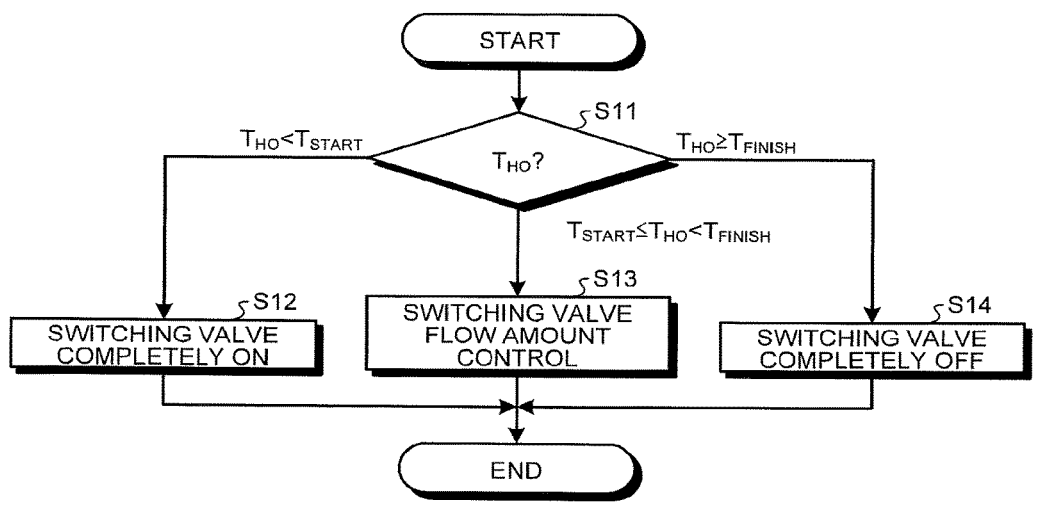
FIG. 7 is a flowchart illustrating an example of heat exchanging amount control in the first variation.

FIG. 7 is a flowchart illustrating an example of heat exchanging amount control in the first variation. An ECU 20 executes the heat exchanging amount control in FIG. 7 immediately after cold start of an engine 1. A determining unit 22 compares an oil temperature $T_{HO}$ with a first temperature $T_{START}$ and a second temperature $T_{FINISH}$ (step S11). The first temperature $T_{START}$ is lower than a lock-up allowing temperature. The second temperature $T_{FINISH}$ is higher than the lock-up allowing temperature. Meanwhile, the temperatures $T_{START}$ and $T_{FINISH}$ are determined in advance.

At step S11, when the determining unit 22 determines that the oil temperature $T_{HO}$ is lower than the first temperature $T_{START}$, the procedure shifts to step S12. At step S12, a control unit 23 completely turns on the switching valve 16 to block the heat exchanging route R1.

At step S11, when the determining unit 22 determines that the oil temperature $T_{HO}$ is not lower than the first temperature $T_{START}$ and lower than the second temperature $T_{FINISH}$ the procedure shifts to step S13. At step S13, the control unit 23 executes control to continuously change the flow amount of the transmission oil flowing in the heat exchanger 11.

At step S11, when the determining unit 22 determines that the oil temperature $T_{HO}$ is not lower than the second temperature $T_{FINISH}$, the procedure shifts to step S14. At step S14, the control unit 23 completely turns off the switching valve 16 to completely open the heat exchanging route R1.

For example, when the oil temperature $T_{HO}$ rises from the temperature lower than the first temperature $T_{START}$ to the temperature not lower than the second temperature $T_{FINISH}$ after the cold start of the engine 1, the control unit 23 executes the control to switch from the non-heat exchanging route R2 to the heat exchanging route R1. When the oil temperature $T_{HO}$ rises within a range not lower than the first temperature $T_{START}$ and lower than the second temperature $T_{FINISH}$, the control unit 23 executes the control (flow amount control) to continuously increase the flow amount of the transmission oil flowing in the heat exchanger 11. That is, the control unit 23 executes the control to continuously increase the transmission oil heat exchanging amount (heat exchanging amount control). In the first variation, the switching valve 16 and the ECU 20 are included in a heat exchanging amount decreasing unit.

Figure 8:
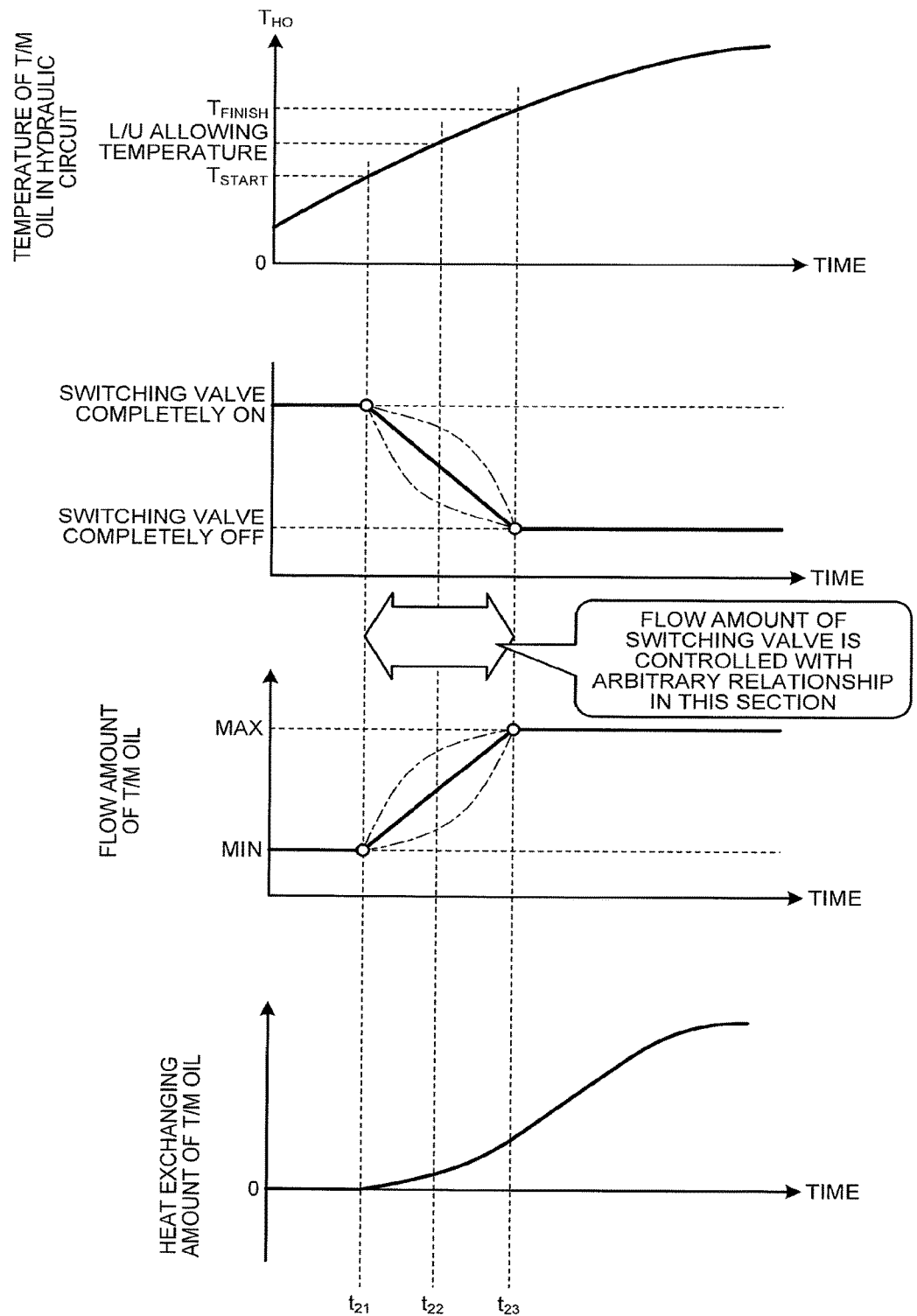
FIG. 8 is a time chart illustrating change in a vehicle state after cold start of an engine of the first variation.

FIG. 8 is a time chart illustrating change in a vehicle state after the cold start of the engine 1 in the first variation. After the cold start of the engine 1, the oil temperature $T_{HO}$ rises to reach the first temperature $T_{START}$ (time point $t_{21}$) At time point $t_{21}$, the ECU 20 starts the flow amount control and the flow amount of the transmission oil flowing in the heat exchanger 11 starts increasing. According to this, the transmission oil heat exchanging amount starts increasing from zero. At that time, the switching valve 16 operates to continuously change the flow amount of the oil flowing in the valve. The transmission oil flow amount continuously increases from a minimum value MIN to a maximum value MAX.

After time point $t_{21}$, the oil temperature $T_{HO}$ continuously rises to reach the lock-up allowing temperature (time point $t_{22}$). Then, the oil temperature $T_{HO}$ rises to be higher than the lock-up allowing temperature to reach the second temperature $T_{FINISH}$ (time point $t_{23}$). At time point $t_{23}$, the ECU 20 controls to completely turn off the switching valve 16. The control unit 23 finishes the control to increase the flow amount of the transmission oil circulating in the heat exchanger 11 at time point $t_{23}$. That is, the transmission oil flow amount reaches the maximum value MAX at time point $t_{23}$.

As described above, according to the first variation, the flow amount of the transmission oil circulating in the heat exchanger may be decreased not only when the oil temperature is lower than the lock-up allowing temperature but also when this is lower than the temperature in a predetermined range including the lock-up allowing temperature. According to this, it is possible to inhibit deterioration in fuel consumption due to heat transfer from the automatic transmission to the engine immediately after the cold start of the engine.

Figure 9A:
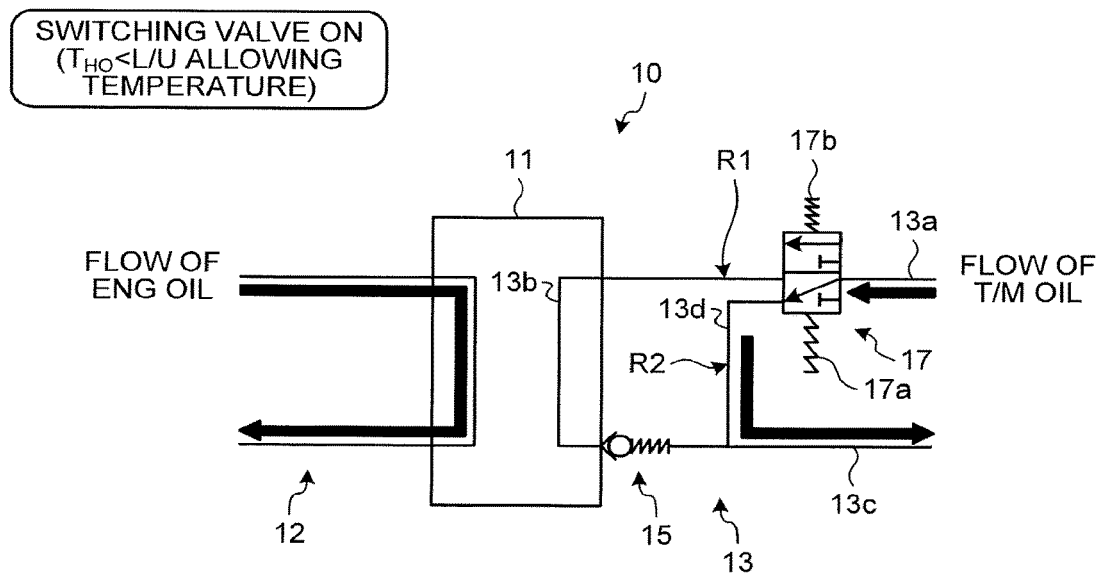
Figure 9B:
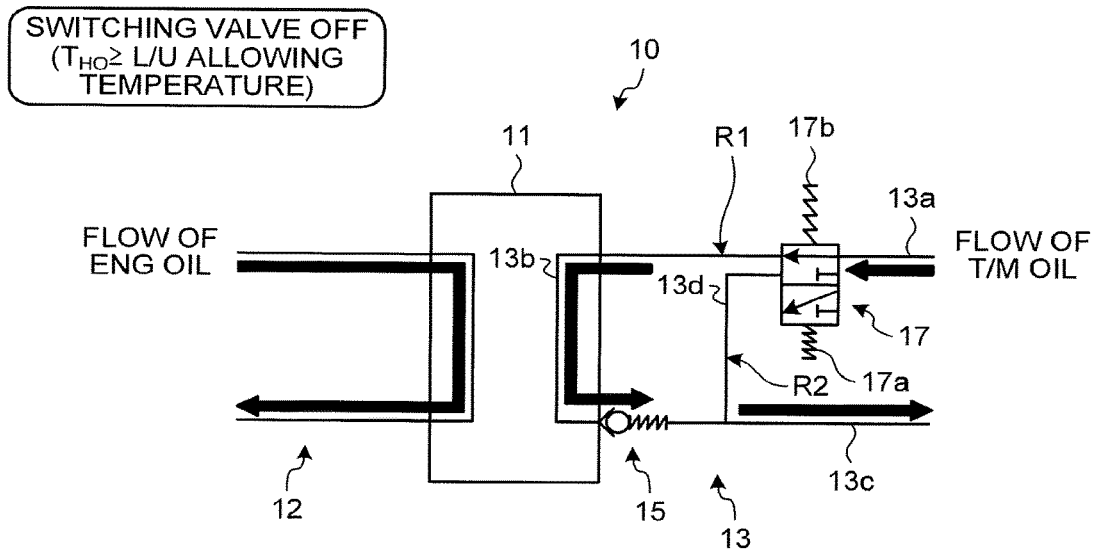
FIG. 9B is an illustrative diagram illustrating the flow of the oil when the switching valve of the second variation is completely turned off.

Next, in a second variation, a thermosensitive switching valve 17 is provided in place of the switching valve 16 formed of the electromagnetic valve of the first variation. FIG. 9A is an illustrative diagram illustrating a flow of oil when the switching valve 17 is turned on. FIG. 9B is an illustrative diagram illustrating the flow of the oil when the switching valve 17 is turned off.

The switching valve 17 is provided with a thermosensitive actuator 17a operating according to an oil temperature $T_{HO}$. The actuator 17a is a shape-memory alloy spring bimetal-deformed according to temperature change. When the actuator 17a is bimetal-deformed, the switching valve 17 is switched between a turned-on state and a turned-off state. Since the switching valve 17 is a flow amount control valve, this operates to increase a flow amount of transmission oil flowing in a heat exchanger 11 when being switched from the turned-on state to the turned-off state, for example.

When the actuator 17a is configured to come in contact with the transmission oil in a transmission oil circulation passage 13, the actuator 17a is bimetal-deformed in response to the oil temperature in an introducing flow passage 13a. In this case, the oil temperature in the introducing flow passage 13a when the oil temperature $T_{HO}$ reaches a lock-up allowing temperature may be specified by a relationship between the oil temperature $T_{HO}$ in a hydraulic circuit 6 and the oil temperature in the introducing flow passage 13a. The actuator 17a may be configured to be bimetal-deformed at the specified oil temperature. Elastic force from a return spring 17b acts on a spool located in the switching valve 17.

As described above, according to the second variation, since the switching valve is provided with the thermosensitive actuator, it is not required to control the switching valve by an electronic control unit. According to this, a process burden of the electronic control unit may be reduced.

3. Second Embodiment

Next, a heat exchanging device 10 of a second embodiment is described. In the second embodiment, a direction switching valve which switches a flow passage of engine oil based on an oil temperature $T_{HO}$ is provided in an engine oil circulation passage 12 in place of the switching valve 14 of the first embodiment.

Figure 10A:
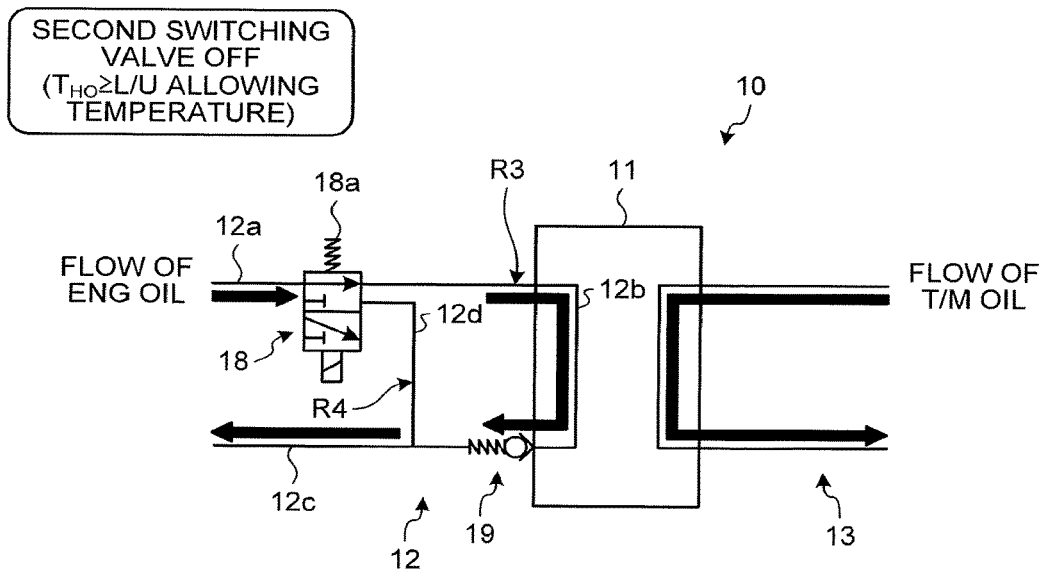
FIG. 10A is an illustrative diagram illustrating a flow of oil when an oil temperature is not lower than a lock-up allowing temperature in a second embodiment.
Figure 10B:
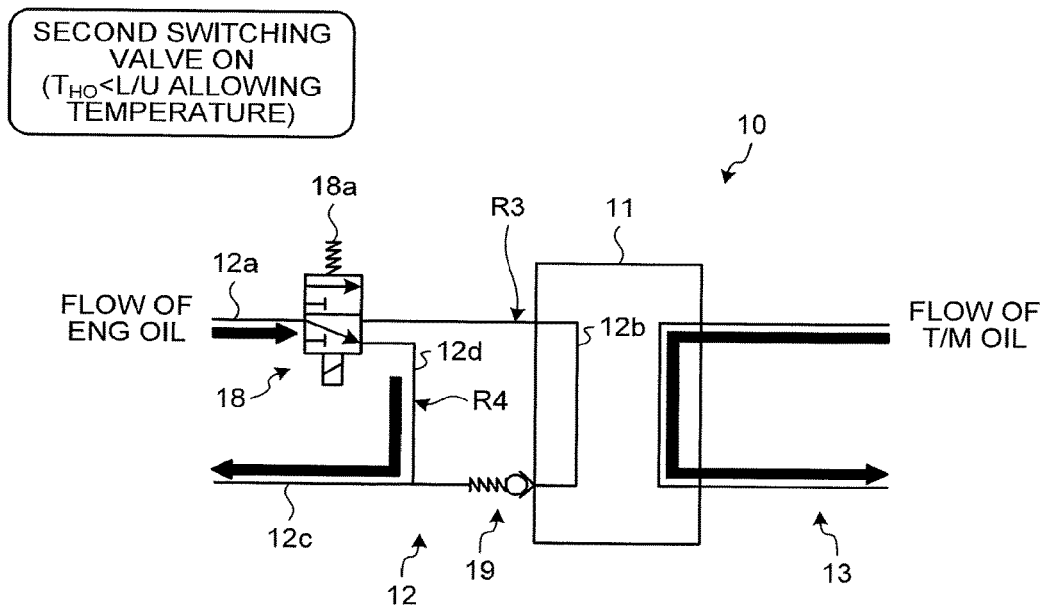
FIG. 10B is an illustrative diagram illustrating the flow of the oil when the oil temperature is lower than the lock-up allowing temperature in the second embodiment.

A flow of the oil in the engine oil circulation passage 12 in the second embodiment is described with reference to FIGS. 10A and 10B. FIG. 10A is an illustrative diagram illustrating the flow of the oil when the oil temperature $T_{HO}$ is not lower than a lock-up allowing temperature in the second embodiment. FIG. 10B is an illustrative diagram illustrating the flow of the oil when the oil temperature $T_{HO}$ is lower than the lock-up allowing temperature in the second embodiment.

The heat exchanging device 10 of the second embodiment is provided with an engine oil switching valve (hereinafter, referred to as "second switching valve") 18 in the engine oil circulation passage 12. The second switching valve 18 switches the flow passage of the engine oil based on the oil temperature $T_{HO}$. Meanwhile, the second switching valve 18 may have the same structure as that of the above-described switching valve 14; this is a spool type electromagnetic valve on which elastic force from a return spring 18a acts. The second switching valve 18 may also be a flow amount control valve formed of the electromagnetic valve or a flow amount control valve provided with a thermosensitive actuator. Furthermore, a method with which an ECU 20 controls the second switching valve 18 may also be similar to that of the above-described first embodiment.

In the engine oil circulation passage 12, the engine oil flowing out of an engine 1 flows in an introducing flow passage 12a to reach the second switching valve 18. A heat exchanging flow passage 12b formed in a heat exchanger 11 and a bypass flow passage 12d communicating with a return flow passage 12c are connected to a downstream side port (outlet) of the second switching valve 18. The heat exchanging flow passage 12b and the bypass flow passage 12d are formed in parallel and a downstream side of the heat exchanging flow passage 12b is connected to the return flow passage 12c through a check valve 19. The engine oil in the return flow passage 12c flows to return to the engine 1. That is, the second switching valve 18 switches a destination of the introducing flow passage 12a between the heat exchanging flow passage 12b and the bypass flow passage 12d, thereby selectively switching between an engine oil heat exchanging route (hereinafter, referred to as "second heat exchanging route") R3 passing through the heat exchanger 11 and an engine oil non-heat exchanging route (hereinafter, referred to as "second non-heat exchanging route") R4 which does not pass through the heat exchanger 11 in the engine oil circulation passage 12.

As illustrated in FIG. 10A, the second heat exchanging route R3 is formed of the introducing flow passage 12a, the second switching valve 18, the heat exchanging flow passage 12b, the check valve 19, and the return flow passage 12c in this order from an upstream side to a downstream side. The second switching valve 18 is turned off when the oil temperature $T_{HO}$ is not lower than the lock-up allowing temperature to open the second heat exchanging route R3 and block the second non-heat exchanging route R4. The engine oil in the second heat exchanging route R3 flows from the introducing flow passage 12a through the second switching valve 18 to flow in the heat exchanging flow passage 12b, so that the engine oil flows in the heat exchanger 11. Then, the engine oil on which heat exchange with transmission oil is performed in the heat exchanger 11 flows from the heat exchanging flow passage 12b through the check valve 19 to flow into the return flow passage 12c and flows in the return flow passage 12c toward the engine 1.

As illustrated in FIG. 10B, the second non-heat exchanging route R4 is formed of the introducing flow passage 12a, the second switching valve 18, the bypass flow passage 12d, and the return flow passage 12c in this order from an upstream side to a downstream side. The second switching valve 18 is turned on when the oil temperature $T_{HO}$ is lower than the lock-up allowing temperature to block the second heat exchanging route R3 and open the second non-heat exchanging route R4. The engine oil in the second non-heat exchanging route R4 flows from the introducing flow passage 12a through the second switching valve 18 to flow in the bypass flow passage 12d, so that the engine oil does not flow in the heat exchanger 11. That is, in the second non-heat exchanging route R4, the engine oil on which the heat exchange with the transmission oil is not performed returns again to the engine 1.

As described above, according to the second embodiment, when the oil temperature is lower than the lock-up allowing temperature during a warm-up of the automatic transmission, a flow amount of the engine oil circulating in the heat exchanger may be decreased as compared to that after the warm-up is completed. According to this, it is possible to inhibit deterioration in fuel consumption due to heat transfer from the automatic transmission to the engine immediately after the cold start of the engine.

4. Third Embodiment

Figure 11A:
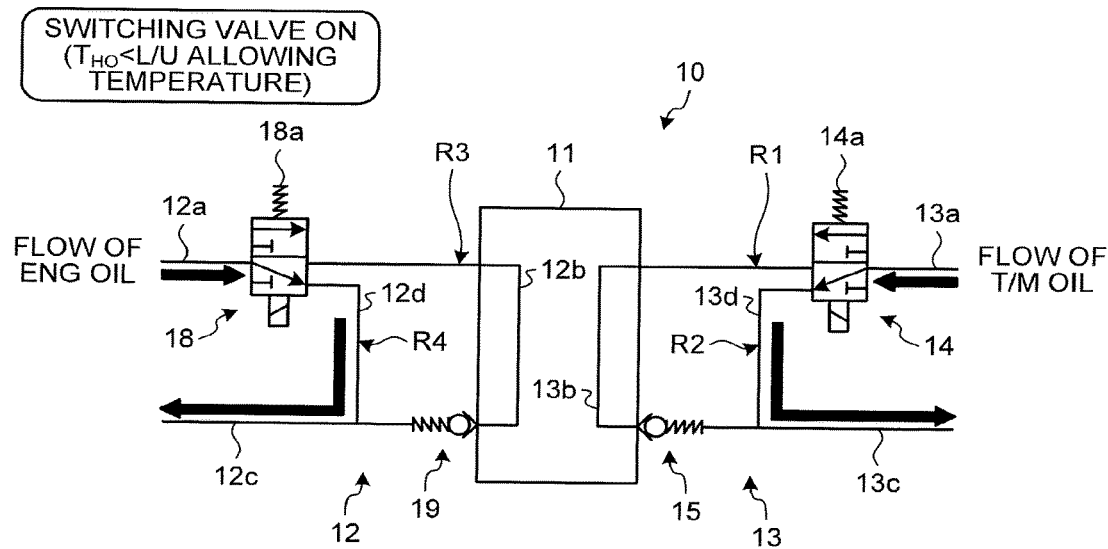
FIG. 11A is an illustrative diagram illustrating a flow of oil when an oil temperature is lower than a lock-up allowing temperature in a third embodiment.
Figure 11B:
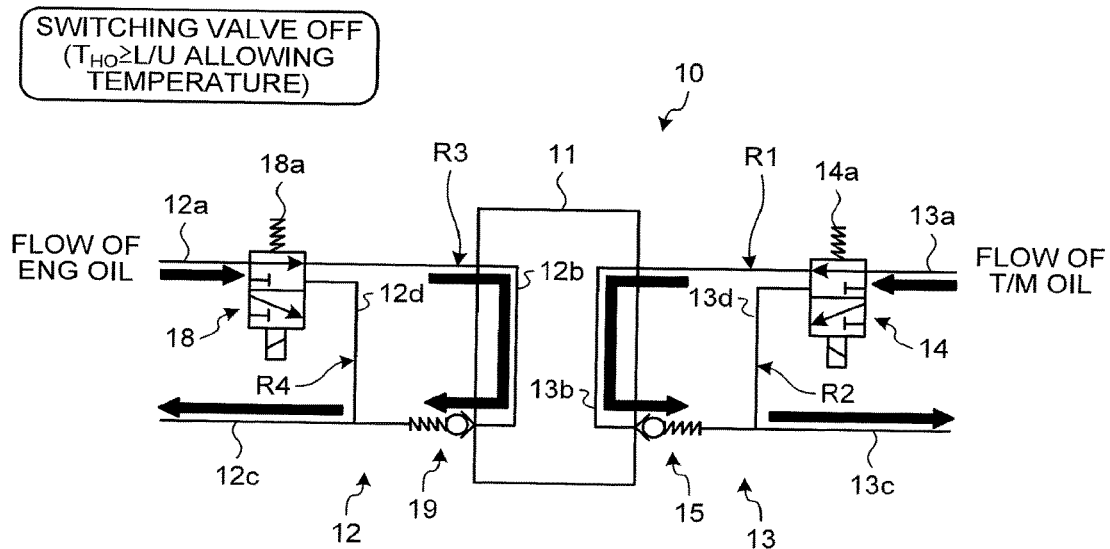
FIG. 11B is an illustrative diagram illustrating the flow of the oil when the oil temperature is not lower than lock-up allowing temperature in the third embodiment.
Figure 12:
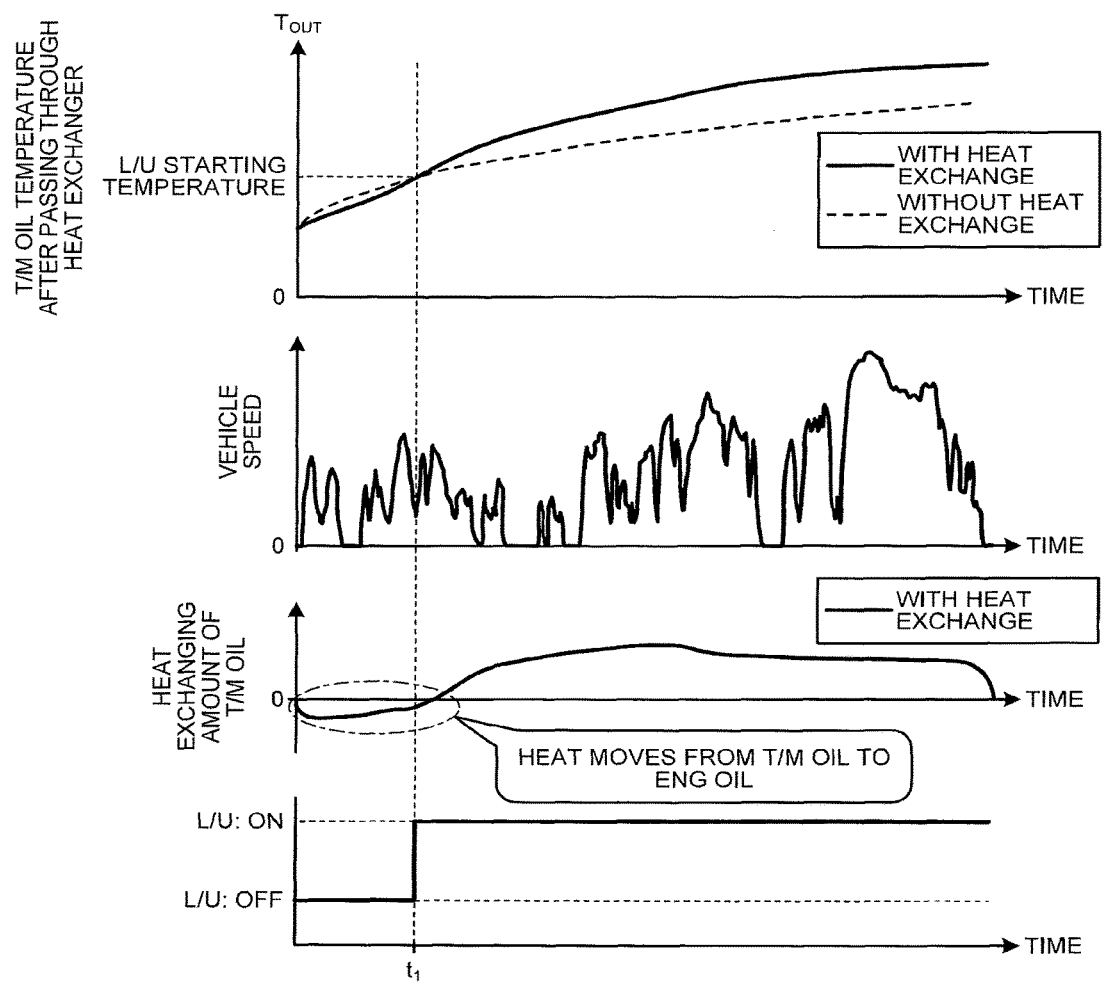
FIG. 12 is a time chart illustrating an evaluation result when a vehicle travels at an arbitrary vehicle speed after cold start of an engine.

Next, a heat exchanging device 10 of a third embodiment is described. The third embodiment is obtained by combining the above-described first and second embodiments. FIG. 11A is an illustrative diagram illustrating an example of a flow of oil when an oil temperature $T_{HO}$ is lower than a lock-up allowing temperature in the third embodiment. FIG. 11B is an illustrative diagram illustrating an example of the flow of the oil when the oil temperature $T_{HO}$ is not lower than the lock-up allowing temperature in the third embodiment.

The heat exchanging device 10 of the third embodiment is provided with a switching valve 14 provided in a transmission oil circulation passage 13 and a second switching valve 18 provided in an engine oil circulation passage 12. As illustrated in FIG. 11A, when the oil temperature $T_{HO}$ is lower than the lock-up allowing temperature, the switching valve 14 blocks a heat exchanging route R1 and the second switching valve 18 blocks a second heat exchanging route R3. As illustrated in FIG. 11B, when the oil temperature $T_{HO}$ is not lower than the lock-up allowing temperature, the switching valve 14 opens the heat exchanging route R1 and the second switching valve 18 opens the second non-heat exchanging route R3.

In the third embodiment, it is configured to block at least one of the heat exchanging route R1 and the second heat exchanging route R3 when the oil temperature $T_{HO}$ is lower than the lock-up allowing temperature. According to this, when the oil temperature $T_{HO}$ is lower than the lock-up allowing temperature, it is possible to decrease a flow amount of at least one of transmission oil flowing in a heat exchanger 11 and engine oil flowing in a heat exchanger 11.

As described above, according to the third embodiment, when the oil temperature is lower than the lock-up allowing temperature during a warm-up of an automatic transmission, it is possible to decrease the flow amount of at least one of the engine oil circulating in the heat exchanger and the transmission oil circulating in the heat exchanger as compared to that after the warm-up is completed. According to this, it is possible to inhibit deterioration in fuel consumption due to heat transfer from the automatic transmission to the engine immediately after the cold start of the engine.

According to one aspect of the disclosure, when the temperature of the second operating oil used in the automatic transmission and the fluid transmitting device is lower than the allowing temperature of the lock-up engagement, the flow amount of at least one of the first and second operating oil flowing in the heat exchanger is decreased as compared to a case in which the temperature of the second operating oil is not lower than the allowing temperature. According to this, it is possible to inhibit the transfer of the heat from the second operating oil of the automatic transmission to the first operating oil of the engine at the time of the warm-up of the automatic transmission, so that the rise in the temperature of the second operating oil may be promoted and the fuel consumption may be improved.

According to another aspect of the disclosure, when the temperature of the second operating oil is lower than a predetermined temperature, the switching valve blocks the heat exchanging route, so that the second operating oil does not circulate in the heat exchanger at the time of the warm-up of the automatic transmission. According to this, it is possible to inhibit the transfer of the heat from the second operating oil to the first operating oil. Therefore, it is possible to promote the rise in the temperature of the second operating oil to improve the fuel consumption. In the heat exchanging device, when the temperature of the second operating oil is not lower than a predetermined temperature, the heat exchanging route is opened, so that the rise in the temperature of the second operating oil may be promoted.

According to still another aspect of the disclosure, when the temperature of the second operating oil is lower than a predetermined temperature, the first operating oil switching valve blocks the first operating oil heat exchanging route, so that the first operating oil does not circulate in the heat exchanger at the time of the warm-up of the automatic transmission. According to this, it is possible to inhibit the transfer of the heat from the second operating oil to the first operating oil. Therefore, it is possible to promote the rise in the temperature of the second operating oil to improve the fuel consumption. In the heat exchanging device, when the temperature of the second operating oil is not lower than a predetermined temperature, the heat exchanging route is opened, so that the rise in the temperature of the second operating oil may be promoted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A heat exchanging device mounted on a vehicle provided with an engine, a fluid transmitting device including a lock-up mechanism, and an automatic transmission connected to the engine through the fluid transmitting device, comprising:

a heat exchanger configured to perform heat exchange between first operating oil used in the engine and second operating oil used in the fluid transmitting device and the automatic transmission; and a heat exchanging amount decreasing unit configured to, when a temperature of the second operating oil is lower than a predetermined temperature at which it is allowed to engage the lock-up mechanism, decrease a flow amount of at least one of the first and second operating oil flowing in the heat exchanger as compared to a case in which the temperature of the second operating oil is not lower than the predetermined temperature.

2. The heat exchanging device according to claim 1, wherein the heat exchanging amount decreasing unit includes a switching valve configured to selectively switch between blockage and opening of a heat exchanging route in which the second operating oil flowing out of the automatic transmission flows through the heat exchanger to return to the automatic transmission, and the switching valve is configured to:

block the heat exchanging route when the temperature of the second operating oil is lower than the predetermined temperature; and open the heat exchanging route when the temperature of the second operating oil is not lower than the predetermined temperature.

3. The heat exchanging device according to claim 1, wherein the heat exchanging amount decreasing unit includes a first operating oil switching valve configured to selectively switch between blockage and opening of a first operating oil heat exchanging route in which the first operating oil flowing out of the engine flows through the heat exchanger to return to the engine, and the first operating oil switching valve is configured to:

block the first operating oil heat exchanging route when the temperature of the second operating oil is lower than the predetermined temperature; and open the first operating oil heat exchanging route when the temperature of the second operating oil is not lower than the predetermined temperature.

4. The heat exchanging device according to claim 2, wherein the heat exchanging amount decreasing unit includes a first operating oil switching valve configured to selectively switch between blockage and opening of a first operating oil heat exchanging route in which the first operating oil flowing out of the engine flows through the heat exchanger to return to the engine, and the first operating oil switching valve is configured to:

block the first operating oil heat exchanging route when the temperature of the second operating oil is lower than the predetermined temperature; and open the first operating oil heat exchanging route when the temperature of the second operating oil is not lower than the predetermined temperature.

* * * * *